(12) United States Patent
Burke et al.

(10) Patent No.: US 6,325,117 B1
(45) Date of Patent: Dec. 4, 2001

(54) BEVERAGE MACHINE DISPENSER SPOUT

(75) Inventors: Michael Joe Burke, Clarksville, IN (US); Eckhard-Uwe Kowalewski, Herscheid (DE)

(73) Assignee: Grindmaster Cratheo Systems, Inc., Louisville, KY (US)

( * ) Notice: Subject to any disclaimer, the term of this patent is extended or adjusted under 35 U.S.C. 154(b) by 0 days.

(21) Appl. No.: 09/702,947

(22) Filed: Oct. 31, 2000

(51) Int. Cl.[7] ................. B65B 1/04; B65B 3/00; B67C 3/00
(52) U.S. Cl. ............ 141/392; 141/369; 141/370; 222/129.1
(58) Field of Search ................. 141/369, 370, 141/371, 392; 222/129

(56) References Cited

U.S. PATENT DOCUMENTS 3,896,977 * 7/1975 Bergstrom ............... 222/353
4,236,553 * 12/1980 Reichenberger ............... 141/198

* cited by examiner

Primary Examiner—Timothy L. Maust
(74) Attorney, Agent, or Firm—Vance A. Smith; Stites & Harbison

(57) ABSTRACT

A beverage dispenser having a downwardly projecting dispensing spout spaced outwardly from the housing of the dispenser and a rib component secured into a position between the housing and the spout to prevent insertion of oversized cups beneath the spout.

2 Claims, 2 Drawing Sheets

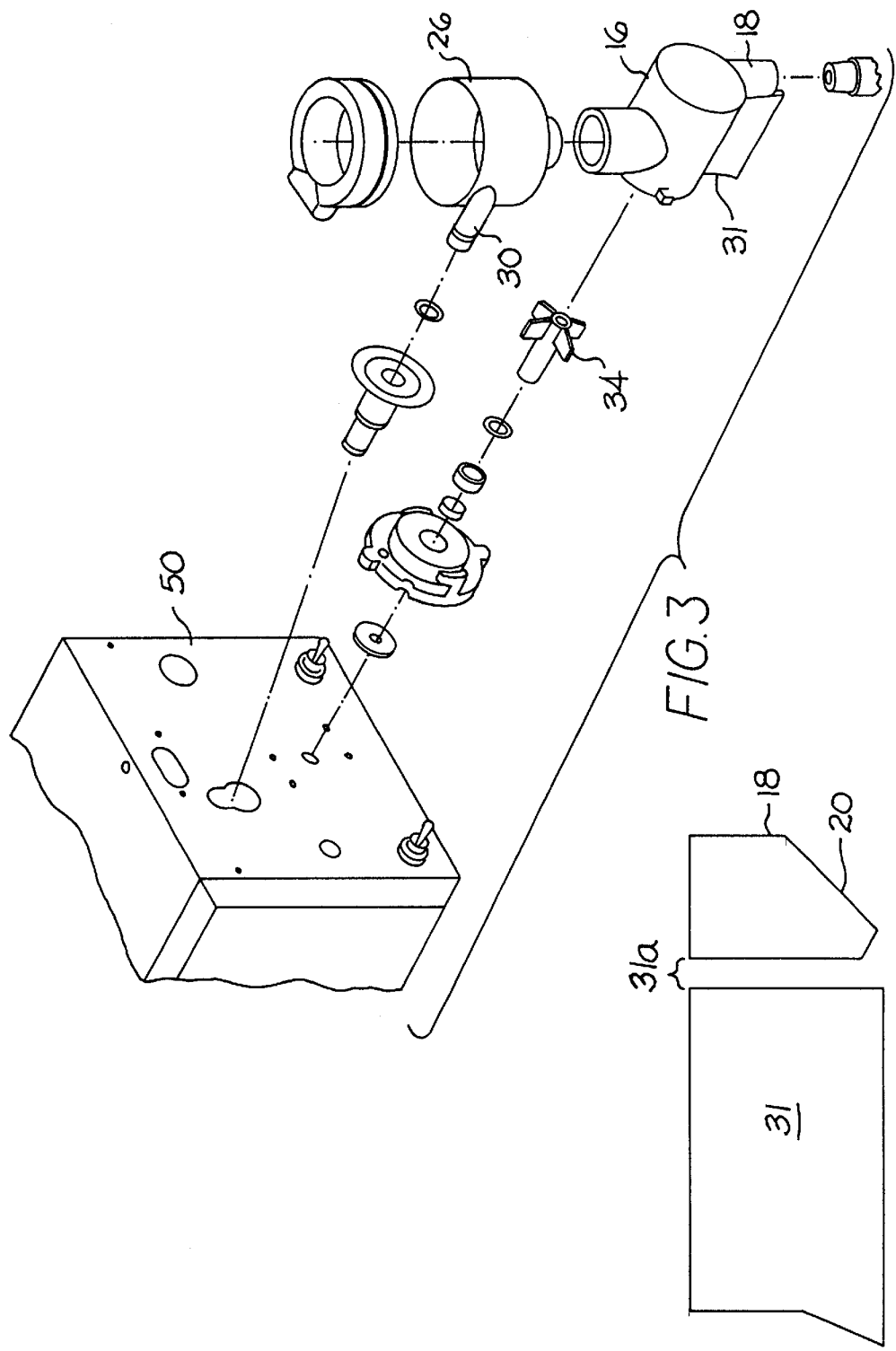

BEVERAGE MACHINE DISPENSER SPOUT

BACKGROUND

The present invention relates to a dispenser spout for a beverage machine, and particularly to a dispenser spout with structure minimizing spilling of a beverage resident in a cup when removing the cup from beneath the spout.

The use of countertop-type beverage dispensers for dispensing individual cups or glasses of beverages is well known. These dispensers are commonly used in the food service industry for dispensing hot coffee, cappuccino, hot chocolate, soups, cold soft drinks, and other beverages. In recent years, many of these countertop-type beverage dispensers have been relocated from behind the service counter where only employees could reach the dispensers to areas within the food service center that allow the individual consumer to dispense the desired beverage. While this arrangement allows the consumer greater flexibility in selecting the beverage desired, including selection of additives such as sugar, cream level, and the like, allowing the individual consumer direct access to the beverage dispenser also increases the probability that the consumer will use the equipment incorrectly. For example, the consumer may be tempted to use a cup that is too tall to properly fit under the dispenser spout. The customer then tilts the cup in order for the cup to pass beneath the spout, resulting in the cup being positioned upright beneath the spout but with the spout actually projecting downwardly into the cup volume below the cup rim. When the cup is filled, the consumer is forced again to tilt the cup in order to remove it from under the spout, with the attendant risks of spilling the hot beverage in the process.

Clearly, the simple remedy to this problem would be to encourage the consumer to use the proper size cup. Typically, however, there are several different types of beverage dispensers that are available and many customers will invariable always select the largest available cup for use. Thus, it is a paramount objective of the present invention to provide for structure that would make it difficult to position cups of improper dimensions beneath the exit port of the beverage dispenser spout.

SUMMARY OF THE INVENTION

In accordance with the present invention, a beverage dispenser has a spout spaced outwardly a first predetermined distance from the dispenser housing and projecting downwardly a second predetermined distance from the beverage making components of the dispenser. The resulting beverage is then dispensed through the spout to an underlying cup positioned on a cup base of the dispenser. A structural member in the form of a rib or a similar component is secured to the dispenser in a position between the housing and the spout. The width of the rib is slightly less than the second predetermined distance, thus defining a gap between said spout and the component. The rib has an effective depth essentially the same as said first predetermined distance so as to present an essentially planar surface coinciding with the end of the spout thereby effectively preventing cups of a height greater than the distance between a lower end of said spout and the base from being positioned on the base beneath said spout.

DETAILED DESCRIPTION OF FIGURES

Figure 2:
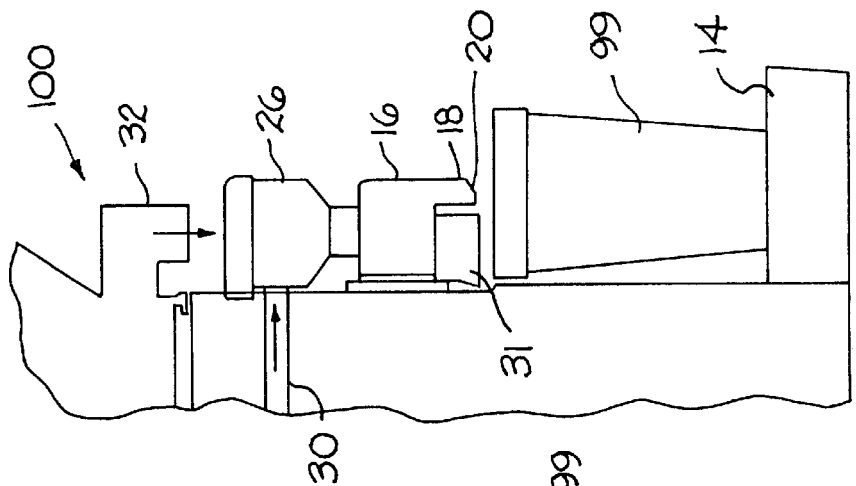
Figure 1A:
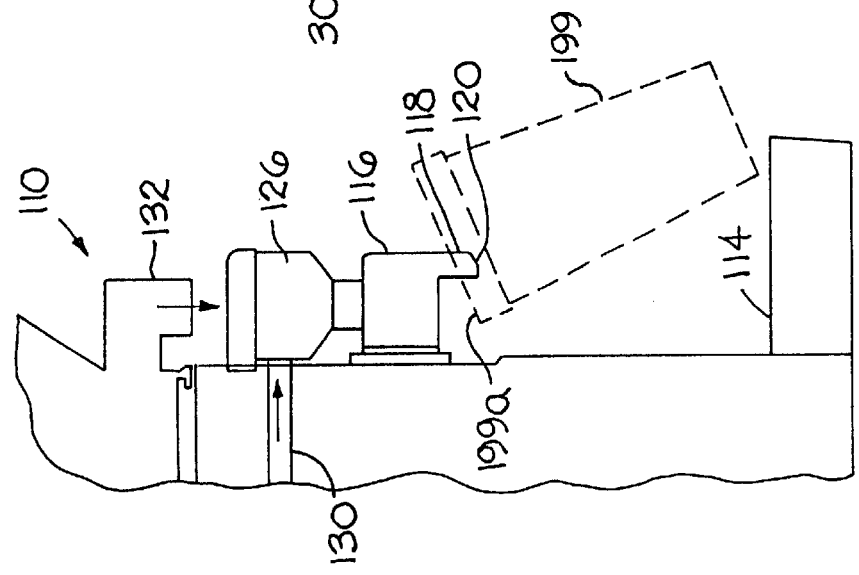
FIG. 1A is a view identical to FIG. 1 showing the tilting of a an oversized full cup for the removal of the cup from beneath the spout of the dispenser of FIG. 1.
Figure 1:
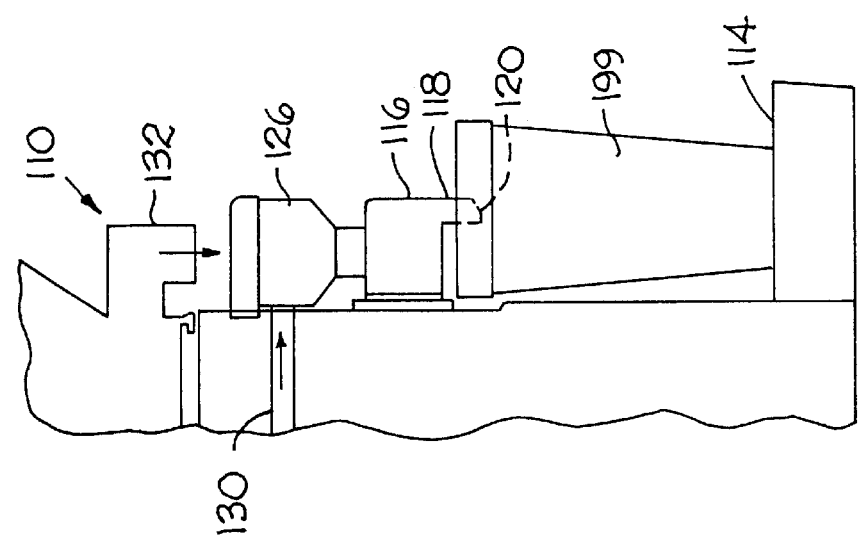
FIG. 1 is a side view of a front portion of a prior art beverage dispenser depicting a spout and structure permitting the tilting the beverage cup and attendant spill risks.

FIG. 2 is a side view of a beverage dispenser of a beverage dispenser similar to that shown in FIG. 1 with spout and spill minimizing structure made in accordance with the present invention; and FIG. 3 is an exploded perspective view of a beverage dispenser incorporating the spout and spill minimizing structure made in accordance with the present invention; and FIG. 4 is an enlarged view of the spout and spill minimizing structure shown in FIG. 2 showing the gap between the spout and structure.

DETAILED DESCRIPTION OF THE PREFERRED EMBODIMENT

The particular beverage dispenser spout depicted in the FIGS. 1–4 is selected solely for the purposes of illustrating the invention, serving only to describe generally a dispenser and should not be construed as limiting the nature of the present invention. Other and different dispensers and spouts may utilize the inventive features described herein as well without departing from the spirit and scope of the present invention.

As shown in FIG. 1, a typical prior art beverage dispenser 110 has storage facilities (not shown) for a hot liquid, such as water, and flavorant ingredients. The hot water communicates It with a whipper funnel 126 through piping 130 while the flavorant is metered through elbow connection 132 into funnel 126. The hot water and flavorant are delivered to a whipping chamber 116 in which the liquid and flavorant are whipped and thoroughly mixed into a beverage. The resulting beverage is then dispensed through the spout 118 into the cup 199 positioned on a base 114 which may or may not include a drainage area. To better illustrate the situation that may occur when using an oversized cup as depicted by cup 199, the lower end or exit nozzle 120 of the spout 118 is shown to extend slightly below the top edge 199a of the cup 199. Because the cup 199 is an oversized cup, it must be initially tilted in order to be placed in an upright position on base 114 under the nozzle 120. Once filled with the beverage, the consumer again must remember to again tilt the cup 199 in order to remove it as shown in FIG. 1A. Failure to do this will result in the top edge 199a of the cup 199 catching on the nozzle 120 of the spout 118 as the cup 199 is being removed with a likely spill of a portion of the hot beverage.

Referring now to FIGS. 2 and 3, a beverage dispenser 100 similar to that of FIG. 1 is again used for dispensing a hot liquid in to a cup 99. The dispenser 100 is provided with a spout 18 having an exit nozzle 20. As best seen in FIG. 3, a front chassis panel 50 forming part of the housing of the dispenser 100 provides a mounting support for the various connections for the whipper funnel 26 and whipping chamber 16. The hot water or liquid is fed through piping connection 30 into the whipper funnel 26 while the flavoring ingredients are metered into the funnel 26 through the elbow connection 32. The water and flavoring ingredients come from storage facilities (not shown) within the dispenser behind the front panel 50. The hot water and flavorant move into the underlying whipping chamber 16 and, after being thoroughly mixed by It the action of whipper blade 34, are dispensed as a beverage through the spout 18 and its nozzle 20 into a cup 99 sitting upright on base 14. As before, the base 14 may or may not include a drainage area.

To prevent the use of oversized cups that result in likely spillage of the hot liquid residing in the cup when the cup is removed, structure is added to the dispenser which does not permit a tall cup from being placed beneath the spout. This component is preferably in the form of a rib 31 positioned between the spout assembly 10 and the back splash 12 of the housing of the dispenser 100. Best shown in FIGS. 2 and 3, the rib 31 may be attached to the undersurface of the whipper chamber 16 and has about the same dimension projecting downward from the undersurface of chamber 16 as the length of the spout 18. The rib 31 thus forms a surface that effectively coincides with the tip of spout 18. Thus, the distance from the base 14 to the tip of spout 18 and the lower surface of rib 31 is essentially the same, ensuring that the spout does not present a "catching" point for any cup that is being removed. Moreover, the rib 31, occupying the space between the spout 18 and the back splash of the dispenser, physically prevents any oversized cup from being initially tilted and then positioned upright beneath the spout 18.

As best seen in FIG. 4, a small gap 31a exists between the rib 31 and the nozzle 20 of spout 18 that has a size sufficient to permit ready replacement of the nozzles including nozzles of various diameters. The gap 31a is also effective to minimize any potential transfer of liquids form the spout nozzle to the undersurface of the rib 31 due to capillary action. A preferred gap width is about 0.09 inches although the precise width of the gap 31 a is not critical as long as the depth of the rib is essentially the same as that of the spout and prevents the oversized cup from being positioned beneath the spout.

It is understood that, in light of a reading of the foregoing description and drawings, those with ordinary skill in the art will be able to make changes and modifications to the present invention without departing from the spirit or scope of the invention, as defined herein.

What is claimed is:

1. In a beverage dispenser having a housing, beverage making components secured to said housing, and a base for placing a cup for receiving a beverage from said disperser, a spout having an upper end communicating with said beverage making components and a downwardly extending length space from said housing and terminating in a lower nozzle end, said lower nozzle end positioned a predetermined distance above said base, and a spacer component secured into a position between said housing and said length of said spout, said component having a bottom surface spaced above said base at essentially said predetermined distance thereby preventing cups of a height greater than said predetermined distance from being positioned on said base beneath said spout.

2. The dispenser of claim 1 wherein said spacer component collectively with said spout length defines a gap between said nozzle end and said spacer component sufficiently large to preclude liquid from being transferred from said nozzle to said component when a beverage is being dispensed from said dispenser.

* * * * *